Aug. 14, 1928.

G. E. HOWARD 1,680,543

FEEDING MOLTEN GLASS

Filed Aug. 20, 1926   2 Sheets-Sheet 1

Inventor
Geo. E. Howard
by Robson & Brown
Attorney.

Aug. 14, 1928.  
G. E. HOWARD  
1,680,543  
FEEDING MOLTEN GLASS  
Filed Aug. 20, 1926  2 Sheets-Sheet 2

Inventor  
Geo. E. Howard  
by Robert A. Brown  
Attorney.

Patented Aug. 14, 1928.

1,680,543

UNITED STATES PATENT OFFICE.

GEORGE E. HOWARD, OF BUTLER, PENNSYLVANIA, ASSIGNOR TO HARTFORD-EMPIRE COMPANY, OF HARTFORD, CONNECTICUT, A CORPORATION OF DELAWARE.

FEEDING MOLTEN GLASS.

Application filed August 20, 1926. Serial No. 130,527.

This invention relates to the art of feeding molten glass, and more particularly to the control of the temperature of molten glass delivered from an outlet in a container.

In the preparation of glass for use in making articles of glassware, the molten glass receives its initial heat in the melting tank, and owing to the great volume of glass usually contained therein, the temperature of the mass of glass may be readily maintained substantially constant. When the glass is distributed to an auxiliary container, such as a feeder forehearth for example, the volume is relatively small and the glass in such quantities is highly sensative to any temperature changes that may occur as a result of the heat being abstracted by the container walls or by uncontrollable air currents present about the container. When the glass issues from the discharge outlet of the container, it may be unevenly cooled by air currents impinging upon one side of the issuing glass. Any such unevenness of temperature tends to produce defects in finished glassware.

Various means have been employed for controlling the temperature of molten glass delivered by glass feeders, such control means including burners or electric heaters for heating the interior of the feeder, insulation for retarding the radiation of heat from the feeder, and draft arrangements for controlling the escape of hot gases from the feeder. The primary object of the present invention is to provide still further refinements in temperature control for glass feeders, by localizing the application of heat to any portion of the container where additional heat is required to impart uniform temperature to the discharge glass. This object is accomplished by providing a plurality of individually controlled heating units disposed about the container walls, and about the discharge orifice through which the glass issues.

Figure 1:
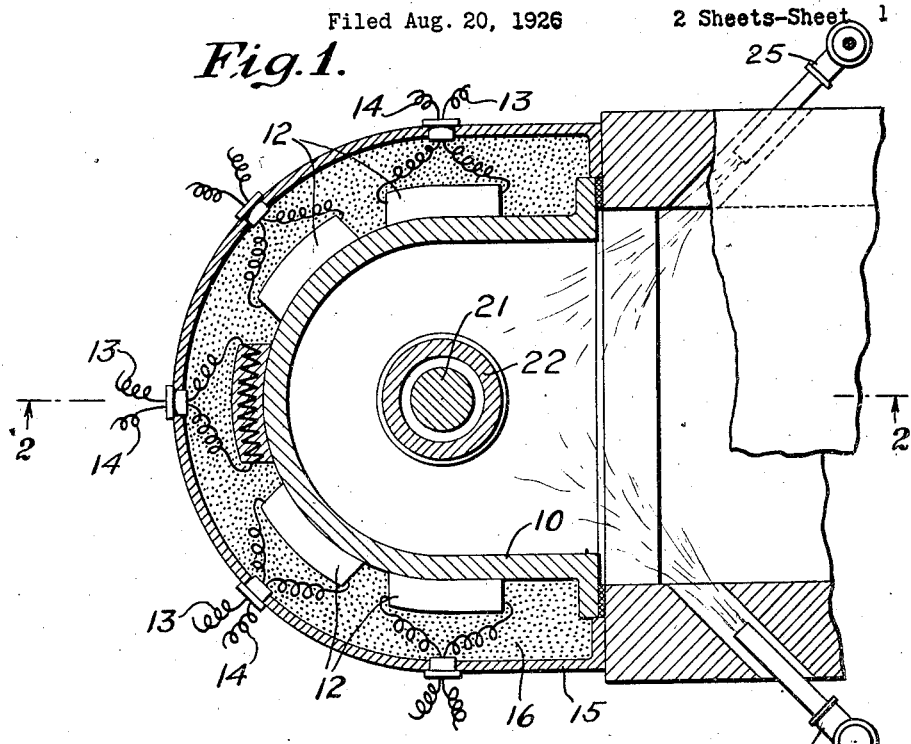
Figure 1 is a horizontal sectional view of a portion of a feeder forehearth having heating units arranged in accordance with my invention.

Figs. 1 to 4 of the drawing show somewhat conventionally a glass feeder construction including a forehearth container having side walls 10 and having a discharge outlet 11 in its bottom. The container walls 10 and the walls of the outlet 11 are both provided with heating elements arranged in accordance with the present invention. The discharge of glass from the container may be regulated by a plunger 21 surrounded by a tube 22, and shears 24 may be arranged beneath the outlet to sever the glass. The interior of the forehearth may be heated by burners 25 and 26 arranged to direct flames into the forward portion of the forehearth.

Figure 2:
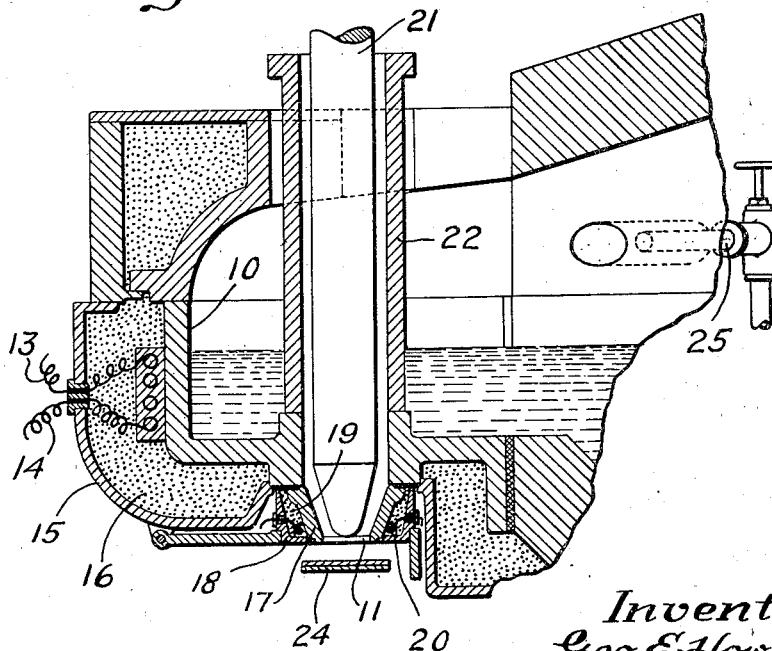
Fig. 2 is a vertical sectional view on line 2—2 of Fig. 1.

As shown in Figs. 1 and 2, a plurality of electric heater units 12 are placed adjacent to the outlet of the container walls 10 and are supplied with energy from any convenient source through conductors 13 and 14. An outer casing 15 is arranged to enclose the container and the heating elements and the intervening space is filled with a suitable heat-insulating material 16, such as kieselguhr for example.

Figure 4:
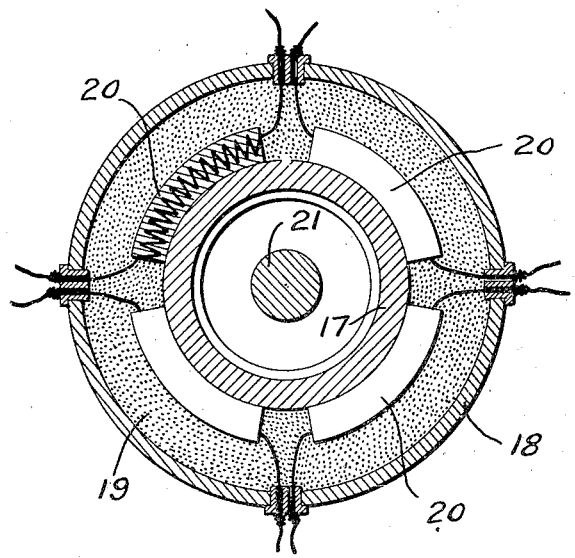
Fig. 4 is a horizontal view, mainly in section on the line 4—4, Fig. 3, showing one arrangement of the heating elements of Fig. 3.
Figure 3:
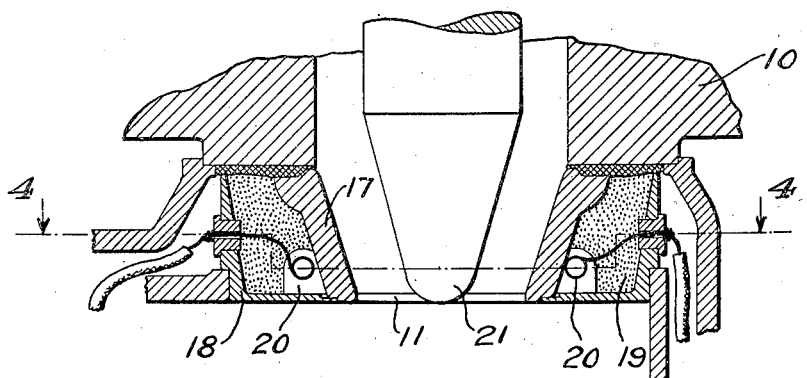
Fig. 3 is a vertical sectional view showing heating elements arranged around the orifice ring of a forehearth discharge outlet.

The outlet 11 is surrounded by a removable refractory orifice ring 17 that is enclosed within a metal casing 18 which also contains heat-insulating material 19. Electric heating units 20 are placed around, and preferably in contact with, the orifice ring 17. Four such heating units are shown in Fig. 4 and are considered to be a sufficient number for practical use. However, any desired number of individually controlled heating units may be employed.

Figure 5:
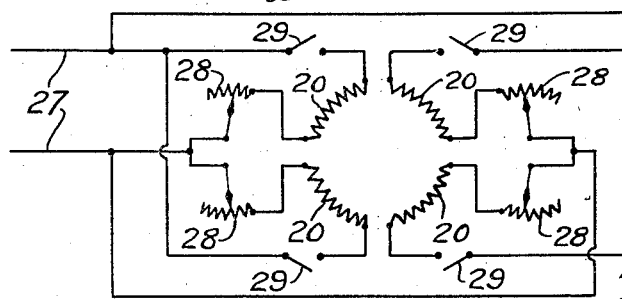
Fig. 5 is a diagrammatic illustration showing a control system for the heating units of Figs. 3 and 4.

The heating units 12 and 20 are provided with individual control means for energizing any one or more of these units at will. In Fig. 5 there is shown diagrammatically a suitable control system for the four heating units 20 that are located about the orifice ring as described above. Electric current is supplied from a main source through conductors 27 and the resistor of each heating unit 20 is provided with an individual rheostat 28 and cut-out switch 29.

While I have shown the outlet ring provided with four heating units disposed angularly about the circumference at the lower edge of the outlet ring, it is obvious that the heating elements may be arranged in staggered relation or any other desired relation to cover the entire surface or region of the outlet ring surface to accomplish the desired result of maintaining the glass in a uniform condition when discharged in a stream or formed into mold charges. The individual control thus provided for the several heating elements enables any side of the orifice ring 17, or any zone of the walls 10, to be locally heated to an adjustable degree to compensate for any undue local cooling of the glass. The heating units may be energized either singly or in groups to produce the desired heating effects.

I am aware that it has been proposed to apply electric heating means to the walls and outlets of glass containers, but without the localized zone control of the application of heat which characterizes the present invention.

Instead of electric heating units herein shown, I may employ damper controlled flues or other suitable means for the passage of hot gases adjacent to the parts to be locally heated.

It is to be understood that my invention is not limited to the heating of forehearth walls and orifice rings, but may be applied with equal advantage to any portions of a container for molten glass wherever it is desired to locally change the temperature of the walls of the container to control the temperature of the glass.

I claim as my invention:

1. As an element of a glass feeder, an outlet structure comprising a refractory discharge ring, a plurality of heating units disposed in spaced relation around the circumference of said ring, and means for independently regulating the heating effect of each unit.

2. As an element of a glass feeder, an outlet structure comprising a refractory discharge ring, a plurality of independently controlled electrical heating units placed adjacent to the ring and arranged around the circumference thereof, and means for regulating the heating effect of each unit.

3. As an element of a glass feeder, an outlet structure comprising a refractory discharge ring, a casing surrounding said ring, a plurality of electrical heating units disposed within the casing adjacent to said ring and arranged about the circumference thereof, and means for independently regulating the heating effect of each unit.

4. As an element of a glass feeder, an outlet structure comprising a refractory discharge ring, a casing surrounding said ring, a plurality of independently controlled electrical heating units located within the casing and each arranged to substantially conform to a portion of the periphery of said ring, said heating units being spaced about the circumference of the ring, and means for independently regulating the temperature of each heating unit.

5. The combination with a receptacle for molten glass having a discharge outlet, of a removable outlet structure comprising a refractory discharge ring, a plurality of electrical heating units disposed around said ring, and means for regulating the temperature of each heating unit independently and for thereby asymmetrically regulating the temperatures of different sides of said ring.

6. The combination with a receptacle for molten glass having a discharge outlet, of a removable outlet structure, comprising a casing, a refractory discharge ring mounted in the casing, a plurality of separate electrical heating units, said units being placed at intervals about the circumference of said refractory member and being located at substantially the same plane, insulating material between said units and said casing, and means for regulating the temperature of each heating unit independently of the other units.

7. The method of feeding a homogeneous mass of molten glass which comprises passing the glass for the subsequent production of mold charges through a heated outlet ring and asymmetrically changing the temperature of different transverse portions of the glass passing through the ring by asymmetrically varying the temperature of the portions of the ring adjacent to such portions of the glass.

8. The method of treating molten glass flowing through a container, which comprises heating the glass by an atmosphere of combustion and changing the temperature of certain transverse portions of the flowing glass by asymmetrically varying the temperature of the portions of the container walls adjacent to such portions of the glass.

9. The method of feeding glass for use in the fabrication of articles of glassware, comprising discharging molten glass from a source of supply through a delivery outlet, and subjecting the glass passing through said outlet to a plurality of independently regulable temperature regulating influences respectively applied at different places located in the same plane and spaced about the central line of flow of the discharging glass.

10. The method of feeding glass in mold charges of axially symmetrical viscosity and temperature, comprising discharging molten glass from a source of supply through a submerged outlet, subjecting the glass passing through said outlet to temperature regulating influences varying at different points around the axis of the outlet to compensate for variations of temperatures of corresponding circumferentially spaced portions of the discharged glass, and severing mold charges from successive discharged portions of the glass.

11. The method of feeding molten glass in mold charges of axially symmetrical viscosity and temperature which comprises discharging molten glass from a source of supply through a discharge oulet, and subjecting the glass passing through the discharge outlet to a differential heating influence varying at different places around the axis of the outlet according to variations in the cooling effects of influences outside of the outlet on corresponding circumferentially spaced portions of the discharged glass, and severing mold charges from successive discharged portions of the glass.

12. The method of feeding molten glass in a mass of axially symmetrical viscosity and temperature which comprises discharging molten glass from a source of supply through a submerged outlet, and variably controlling the temperature of a plurality of circumferentially spaced portions of the glass passing through said outlet to compensate for axially asymmetrical temperature changing influences on the glass issuing from the outlet.

Signed at Hartford, Conn., this 4th day of August, 1926.

GEORGE E. HOWARD.